United States Patent
Carter, Jr. et al.

(10) Patent No.: US 10,528,838 B1
(45) Date of Patent: Jan. 7, 2020

(54) AUGMENTED REALITY CONFIDENTIAL VIEW

(71) Applicant: Wells Fargo Bank, N.A., San Francisco, CA (US)

(72) Inventors: Robert L. Carter, Jr., Pleasant Hill, IA (US); Kourtney Eidam, Marietta, GA (US); Andres J. Saenz, Redmond, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/836,592

(22) Filed: Aug. 26, 2015

Related U.S. Application Data

(63) Continuation-in-part of application No. 14/493,919, filed on Sep. 23, 2014, now Pat. No. 9,767,585.

(51) Int. Cl.
| | |
|---|---|
| *G06K 9/20* | (2006.01) |
| *G06T 19/00* | (2011.01) |
| *G06F 3/0482* | (2013.01) |
| *G06F 21/60* | (2013.01) |
| *G06F 21/31* | (2013.01) |

(Continued)

(52) U.S. Cl.
CPC ......... *G06K 9/2063* (2013.01); *G06F 3/0482* (2013.01); *G06F 21/31* (2013.01); *G06F 21/32* (2013.01); *G06F 21/60* (2013.01); *G06Q 20/383* (2013.01); *G06T 19/006* (2013.01)

(58) Field of Classification Search
CPC ......... G09G 5/14; G06T 19/00; G06T 19/006; G02B 27/0101; G02B 27/017; G02B 2027/0178; G06F 17/273; G06F 21/10; G06F 21/31; G06F 21/32; G06F 21/60; G06F 3/0482; G06F 21/64; H04L 63/08; G06Q 20/206; G06Q 20/401; G06Q 20/383; G06K 9/2063
USPC .... 345/7, 418, 619, 421, 629–635; 715/271; 705/18, 24, 14.17, 26.8, 75, 271; 726/2, 726/4, 26–28
See application file for complete search history.

(56) References Cited

U.S. PATENT DOCUMENTS

| | | |
|---|---|---|
| 5,774,878 A | 6/1998 | Marshall |
| 7,876,335 B1 * | 1/2011 | Pittenger ................. G06F 17/21 345/619 |

(Continued)

FOREIGN PATENT DOCUMENTS

| | | |
|---|---|---|
| AU | 2013100154 A4 | 4/2013 |
| KR | 10-2011-0078913 A | 7/2011 |

OTHER PUBLICATIONS

U.S. Appl. No. 14/493,919, filed Sep. 23, 2014 entitled "Augmented Reality Confidential View".

(Continued)

*Primary Examiner* — Chante E Harrison
(74) *Attorney, Agent, or Firm* — Merchant & Gould P.C.

(57) ABSTRACT

A method implemented on an augmented reality (AR) device includes receiving an image of a document on the AR device. The image of the document includes one or more areas of obfuscated text. A marker on the document is identified. The marker is associated with an area of obfuscated text on the document. The marker is scanned using the AR device. When the user of the AR device is authenticated, a non-obfuscated image of the text associated with the marker is displayed on the AR device.

11 Claims, 11 Drawing Sheets

| | |
|---|---|
| Borrower's Name | John Doe |
| Social Security Number | 123-45-6789 |
| Marital Status | Married |
| DOB | 08-06-1974 |
| Address | 20 Peony Lane, Home Town, USA |
| Home Phone | 345-876-1234 |

(51) Int. Cl.
*G06F 21/32* (2013.01)
*G06Q 20/38* (2012.01)

(56) References Cited

U.S. PATENT DOCUMENTS

| | | | |
|---|---|---|---|
| 8,316,450 B2 | 11/2012 | Robinson et al. | |
| 8,347,398 B1* | 1/2013 | Weber | G06F 21/85 |
| | | | 713/189 |
| 8,438,110 B2 | 5/2013 | Calman et al. | |
| 8,544,103 B2 | 9/2013 | Nilsson | |
| 8,925,053 B1* | 12/2014 | Mehta | G06F 21/31 |
| | | | 713/155 |
| 9,767,585 B1 | 9/2017 | Carter, Jr. et al. | |
| 2005/0015723 A1* | 1/2005 | Light | G06Q 10/10 |
| | | | 715/271 |
| 2005/0114672 A1* | 5/2005 | Duncan | G06F 21/10 |
| | | | 713/182 |
| 2007/0185814 A1* | 8/2007 | Boccon-Gibod | G06F 21/10 |
| | | | 705/51 |
| 2007/0204078 A1* | 8/2007 | Boccon-Gibod | G06F 21/64 |
| | | | 710/54 |
| 2010/0332993 A1 | 12/2010 | Bousseton et al. | |
| 2011/0187743 A1 | 8/2011 | Hwang et al. | |
| 2011/0206285 A1 | 8/2011 | Hodge et al. | |
| 2011/0225069 A1 | 9/2011 | Cramer et al. | |
| 2012/0084135 A1 | 4/2012 | Nissan et al. | |
| 2012/0167047 A1 | 6/2012 | Wyler et al. | |
| 2012/0231424 A1 | 9/2012 | Calman et al. | |
| 2012/0231814 A1 | 9/2012 | Calman et al. | |
| 2012/0232937 A1 | 9/2012 | Calman et al. | |
| 2012/0232966 A1 | 9/2012 | Calman et al. | |
| 2012/0232968 A1 | 9/2012 | Calman et al. | |
| 2012/0232976 A1 | 9/2012 | Calman et al. | |
| 2012/0232977 A1 | 9/2012 | Calman et al. | |
| 2012/0233015 A1 | 9/2012 | Calman et al. | |
| 2012/0233032 A1 | 9/2012 | Calman et al. | |
| 2012/0233072 A1 | 9/2012 | Calman et al. | |
| 2012/0242696 A1 | 9/2012 | Martin | |
| 2013/0033522 A1* | 2/2013 | Calman | G06Q 30/0633 |
| | | | 345/633 |
| 2013/0083066 A1 | 4/2013 | Aoki et al. | |
| 2013/0222426 A1 | 8/2013 | Hymel | |
| 2013/0272523 A1 | 10/2013 | McCorkindale et al. | |
| 2013/0278635 A1 | 10/2013 | Maggiore | |
| 2014/0002643 A1 | 1/2014 | Aziz et al. | |
| 2014/0026182 A1* | 1/2014 | Pearl | G06F 21/60 |
| | | | 726/1 |
| 2014/0067575 A1 | 3/2014 | Nevada | |
| 2014/0098130 A1 | 4/2014 | Fein et al. | |
| 2014/0105449 A1 | 4/2014 | Caton et al. | |
| 2014/0230071 A1 | 8/2014 | Adam et al. | |
| 2014/0283100 A1 | 9/2014 | Harrison | |
| 2014/0373176 A1* | 12/2014 | Arning | G06F 21/6218 |
| | | | 726/28 |
| 2015/0062159 A1* | 3/2015 | Hildreth | G02B 27/0172 |
| | | | 345/633 |
| 2015/0145887 A1* | 5/2015 | Forutanpour | G06F 3/017 |
| | | | 345/633 |
| 2015/0161483 A1 | 6/2015 | Allen et al. | |
| 2015/0200922 A1* | 7/2015 | Eschbach | H04L 63/08 |
| | | | 358/1.14 |
| 2015/0277839 A1 | 10/2015 | Stewart, III et al. | |
| 2016/0014160 A1* | 1/2016 | Demirli | H04W 12/02 |
| | | | 726/27 |
| 2016/0027124 A1 | 1/2016 | Rojas | |
| 2016/0232480 A1 | 8/2016 | Erez et al. | |
| 2018/0068289 A1 | 3/2018 | Nevada | |
| 2018/0089459 A1 | 3/2018 | Eisen et al. | |
| 2018/0089660 A1 | 3/2018 | Elliott et al. | |

OTHER PUBLICATIONS

Fragoso, V. et al., "TranslatAR: A Mobile Augmented Reality Translator," IEEE Workshop on Applications of Computer Vision (WACV), pp. 497-502 (Jan. 5-7, 2011).
Perey, C., "Print and publishing and the future of Augmented Reality," PEREY Research & Consulting, 7 pages (Jan. 12, 2011).
Riley-Smith, B., "Augmented reality glasses 'translate foreign menus as you read'"-, The Telegraph, http://www.telegraph.co.uk/technology/news/10344580/Augmented-reality-glasses-translate-foreign-menus-as-you-read.html, 2 pages (Sep. 30, 2013).
Starner, T. et al., "Augmented Reality Through Wearable Computing," The Media Laboratory, Massachusetts Institute of Technology, 24 pages (1997).
Translate text with Goggles, https://support.google.com/websearch/answer/181356?hl=en (Publicly known at least as early as Jan. 17, 2014).

* cited by examiner

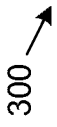
FIG. 3a
FIG. 3b

| Date | Description | Amount |
|---|---|---|
| 06/20/2014 | XYZ Restaurant | $75.26 |
| 06/21/2014 | Gift — 404 | 406 — xxxxx |
| 06/25/2014 | ABC Department Store | $138.35 |
| Total | | 408 — $213.61 |

FIG. 4a

| Date | Description | Amount |
|---|---|---|
| 06/20/2014 | XYZ Restaurant | $75.26 |
| 06/21/2014 | QRS Jewelers — 412 | 414 — $375.00 |
| 06/25/2014 | ABC Department Store | $138.35 |
| Total | | 416 — $588.61 |

| Trans. Code | Date | Description | Amount |
|---|---|---|---|
| 12345 | 06/20/2014 | XYZ Restaurant | $75.26 |
| 504 — Gift23456 | 06/21/2014 | Retail Store — 506 | 508 — xxxxx |
| 34567 | 06/25/2014 | ABC Department Store | $138.35 |
| | Total | | 510 — $213.61 |

FIG. 5a

| Trans. Code | Date | Description | Amount |
|---|---|---|---|
| 12345 | 06/20/2014 | XYZ Restaurant | $75.26 |
| 514 — 23456 | 06/21/2014 | QRS Jewelers — 516 | 518 — $375.00 |
| 34567 | 06/25/2014 | ABC Department Store | $138.35 |
| | Total | | 520 — $588.61 |

FIG. 5b

| Borrower's Name | John Doe |
|---|---|
| Social Security Number | C*nfidential — 304 |
| Marital Status | Married |
| DOB | C*nfidential — 306 |
| Address | C*nfidential — 308 |
| Home Phone | 345-876-1234 |

FIG. 11a

| Borrower's Name | John Doe |
|---|---|
| Social Security Number | 123-45-6789 — 1102 |
| Marital Status | Married |
| DOB | 08-06-1974 — 1104 |
| Address | 20 Peony Lane, Home Town, USA — 1106 |
| Home Phone | 345-876-1234 |

AUGMENTED REALITY CONFIDENTIAL VIEW

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality (AR) device. The method comprises: receiving an image of a document on the AR device, the image of the document including one or more areas of obfuscated text; identifying a marker on the document, the marker being associated with an area of obfuscated text on the document; scanning the marker using the AR device and; when the user of the AR device is authenticated, displaying on the AR device a non-obfuscated image of the text associated with the marker.

In another aspect, a method implemented on an augmented reality (AR) device comprises: receiving an image of a financial statement at the AR device, the financial statement including details regarding one or more purchase transactions, some of the details regarding at least one of the purchase transactions being obfuscated on the financial statement; receiving an image of an obfuscated section associated with the at least one purchase transaction; identifying a user of the AR device; and when a determination is made that the user of the AR device is an authorized user for the AR device, displaying non-obfuscated details regarding the at least one purchase transaction.

In yet another aspect, an augmented reality (AR) electronic device comprises: a processing unit; and system memory, the system memory including instructions which, when executed by the processing unit, cause the AR device to: receive an image of a document, the image of the document including one or more areas of obfuscated text; identify an area of obfuscated text on the document; identify a marker on the document associated with the identified obfuscated text; scan the marker; authenticate a user of the AR device; and when the user of the AR device is authenticated, display a non-obfuscated image of the text.

The details of one or more techniques are set forth in the accompanying drawings and the description below. Other features, objects, and advantages of these techniques will be apparent from the description, drawings, and claims.

DESCRIPTION OF THE DRAWINGS

FIG. 3a shows an example section of a scanned document.

FIG. 3b shows another view of the scanned document of FIG. 3a.

FIG. 4a shows an example section of a payment card statement.

FIG. 4b shows another view of the payment card statement of FIG. 4a.

FIG. 5a shows an example section of another payment card statement.

FIG. 5b shows another view of the payment card statement of FIG. 5a.

FIG. 11a shows another example section of a scanned document.

FIG. 11b shows another view of the scanned document of FIG. 11a.

DETAILED DESCRIPTION

Figure 1:
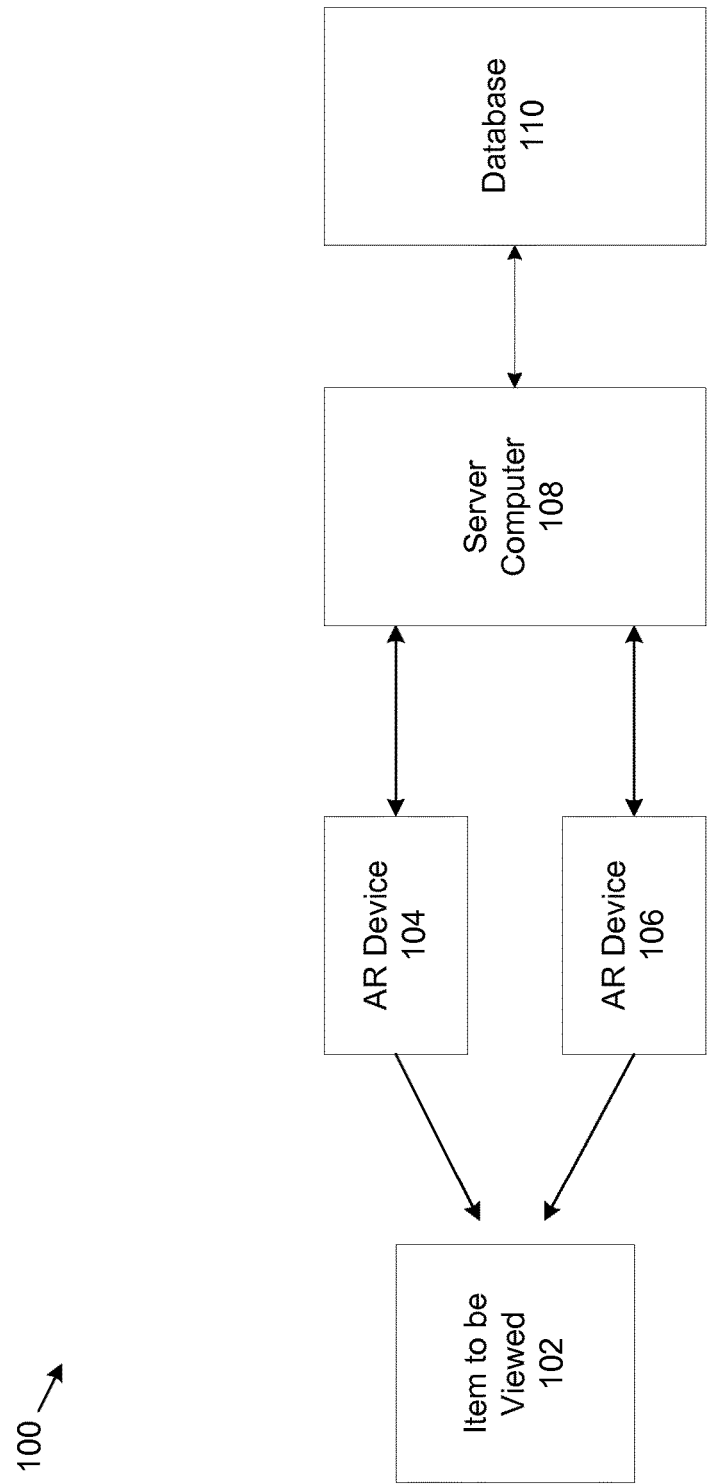
FIG. 1 shows an example system that supports an augmented reality (AR) confidential view.

The present disclosure is directed to systems and methods for using an AR device to view confidential material obfuscated or otherwise unviewable in a document using an AR device. All or part of the document may be obfuscated. The present disclosure also is directed to using an AR device to select material to be deemed confidential and obfuscated in a document. The AR device that is used to view the confidential material can be the same AR device that obfuscated the confidential material or it can be a different AR device.

In one example embodiment, when an identified section of a document is marked as confidential, a marker can be used to identify the confidential section of the document or to indicate that the document contains one or more confidential sections. One type of marker can be a variation of the word confidential. One or more letters can be changed to special characters to distinguish the marker from the actual word confidential. For example, the marker can be "C*nfidential", whereby the "o" in confidential is replaced by an asterisk. In other examples, digits can be inserted into the word confidential or characters can be rearranged in the word confidential. In yet other examples, other forms of markers can be used, such as optically scannable code (e.g. QR codes), specific colors or symbols, a string of characters decryptable only by the AR device, or markers that are embedded within text and are not visible to the naked eye when viewing the document.

In some embodiments, individuals can be pre-authorized to obtain access to view confidential information on documents. In these embodiments, an individual can access a website where the individual can enter authorization information. The individual can enter authentication information such as a social security number, date of birth, and other personal information and a determination can be made whether to authorize confidential access for the individual. When access is granted, biometric data can be obtained from the individual so that the individual can be authenticated by a biometric authentication method. For example, a photo may be taken of the individual, a finger print may be taken of the individual, a retinal image may be taken of the individual and a voice print may be obtained from the individual. In some embodiments, the user can assign a back-up person to be authorized to obtain access to view confidential material when the user is not available.

When the individual is authenticated and the individual views a confidential marker on the document using the authorized AR device, obfuscated content identified by the marker becomes unobfuscated and is displayed on a display screen of the individual's AR device. In some examples, the individual can also see a record of changes made to the document including who made the changes and when.

In some embodiments, to obfuscate confidential portions of a document, a user can view a document with an AR device and scan a section of the document that the user wants to make confidential. For example, the user may want to make certain terms in a document confidential, such as a social security number, salary information, credit score information, a person's address or marital status, etc. The user may also wish to redact certain sensitive sections of the document. After the user selects an identified section of the document to be made confidential, the user can issue a verbal command such as "mark as confidential." When the user issues the verbal command, the identified section of the document is electronically marked as confidential. In addition, the identified section of the document can be electronically redacted or otherwise obfuscated.

After one or more sections of the document have been marked as confidential, the user can send the document to others. The user can send the document to others in an email or the user can print out a hard copy of the document with the marker inserted into the obfuscated areas of the document. When the document is received by others, the obfuscated sections of the document remain obfuscated so that unauthorized individuals are not able to view the content of the obfuscated sections of the document. Only authorized individuals who view the document using an authorized AR device are able to view the content of the obfuscated sections of the document. An authorized AR device is an AR device that is either owned by the individual or assigned to the individual.

In an example implementation, a loan officer at a bank can email a loan document to a customer. Certain sensitive information in the document, for example the user's social security number, credit score, address, date of birth, etc. can be obfuscated in the document and identified with markers. When the customer receives the document, the customer can view a marker in the document with an authorized AR device and issue a verbal command such as "open confidential view." Alternatively, the AR device can automatically identify the marker and launch the confidential view application. The customer can then see the sensitive information unobfuscated. When in confidential view, the customer can edit the sensitive information in the document and resend the document to the loan officer. When the document is resent to the loan officer, any edited changes to the sensitive information are obfuscated. The loan officer cannot view the sensitive information unless the loan officer views the sensitive information on an authorized AR device. The authorized sender and authorized recipient have the option to print out a copy of the document, such as a contract, with the confidential information unobfuscated for their records.

When the individual who marked sections of the document as confidential sends the document to others, the individual can specify additional qualifiers for viewing the document. For example, the individual can specify that the marked copies of the document can be unobfuscated only when viewed in a certain geolocation, for example a business office and/or only at certain times, such as during normal business hours. The individual who sends the document to others can also specify a time period for the confidential sections of the document to remain confidential. For example, the individual can specify that one or more sections of the document remain confidential until a specific date, such as when a product is to be made public.

In another example embodiment, a user of an AR device may obfuscate one of more items on a retail receipt. For example, the user may buy a gift for his wife and may not want an indication of the purchase to appear on a payment card or banking statement where his wife may view the purchase. For this embodiment, the user can scan the retail receipt using the AR device and issue a verbal command such as "mark as gift." For a retail receipt in which the user may have purchased additional items besides the gift, the user can highlight a line on the retail receipt corresponding to the purchase of the gift using the AR device and issue the verbal command after the line is highlighted.

When the user issues the verbal command, a marker is electronically associated with the identified item. The marker can then appear on the payment card or banking statement (e.g. a paper document or online document) and the cost and/or description of the purchase can be obfuscated on the payment card or banking statement. When a person not authorized to view non-obfuscated content on the payment card or banking statement views the payment card or banking statement, the unauthorized person will see the marker, for example a variation of the word "gift" and will not be able to read the obfuscated content. However, when the user views the payment card or banking statement using an authorized AR device and the user views the marker, the user can view an unobfuscated description of the gift purchase and the user can view the actual price paid for the gift. The unobfuscated description of the gift purchase and the cost of the gift can appear as on overlay on the display screen of the AR device.

For the example embodiment involving the retail receipt, the marker can be a variation of the word "gift." One or more characters in the word "gift" may be replaced by special characters, one or more digits may be prefixed, suffixed or embedded within "gift", the characters within "gift" may be rearranged or translated into other characters or other variations may be used. Alternatively, the marker can be, for example, an optical code, color, symbol, a string of characters, or invisible markers that are embedded within text as described above. The determined syntax for the marker is known at the AR device through Optical Character Recognition (OCR) as the pre-set marker so that the AR device can recognize the marker when scanning the payment card or banking statement.

The marker for the retail receipt can be time sensitive. For example, the marker may be removed automatically on a specific date, such as the day after the user's wife's birthday. When the marker is removed, obfuscated data on an online version of the payment card or banking statement can be viewed unobfuscated without the need to use an AR device. The obfuscated data will still remain on a hard copy of the payment card or banking statement. However, new payment card and banking statements may be printed showing unobfuscated information.

In some cases, the user may have a joint account with the user's wife. For the case of joint accounts, additional information may be needed before the user can obtain access to confidential, obfuscated information. For example, if both the user and his wife are authorized to access the account, a determination can be made as to whether the person requesting access is the user or his wife. For example, for online access to the account information, the determination can be made based on the login credentials provided. When a determination is made that the person requesting access is the user's wife and a determination is made that there is a user transaction on the payment card or banking statement involving a gift, instead of displaying non-obfuscated information regarding the transaction to the wife, a message can be displayed indicating to the wife that there is a gift transaction on the payment card or banking statement.

In some example embodiments, the AR device can be used to view recent activity regarding documents. For example, instead of or in addition to viewing a current banking statement, credit card statement, etc., the user can issue a verbal command such as "recent activity" and see transactions or changes that may have occurred since the banking statement, credit card statement, etc. was generated. The user may also be able to view recent changes to a document. For example, when the user receives a document in the mail or via email and the user issues the verbal command such as "recent activity," the user may be able to determine whether any edits were made to the document and to view the edits.

The systems and methods are generally described for an AR device that may be worn or carried by a user. An example of and AR device that may be worn by the user is an AR headset. An example of an AR device that may be carried by the user is a smartphone or tablet computer that includes AR components such as a processor, display and camera and an AR software application.

The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, the wearable computer also includes biometric capability such as facial recognition, retinal scan capability, finger print and voice print capability. The optical display reflects projected images and also permits the user to see through the display.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

FIG. 1 shows an example system 100 that supports an AR confidential view. As used in this disclosure, AR confidential view refers to identifying, marking and obfuscating confidential information in a document using an AR device and viewing actual content of the obfuscated, confidential information using an AR device.

System 100 includes an item to be viewed 102, AR devices 104, 106, server computer 108 and database 110. The item to be viewed 102 can be a document that includes confidential or sensitive information. For example, the document may be a financial document such as a loan application, a mortgage, a credit card statement, a banking statement, a credit score report, a brokerage report, a business document such as a management report, a research and development report, a field service report or another type of document or paper such as a gift receipt. AR device 104 is an AR headset device such as Google Glass. AR device 106 is a smart phone with an AR software application.

Server computer 108 is a server computer for a bank or other financial institution. Database 110 is a database associated with the bank or financial institution. Server computer 108 interfaces with AR devices 104, 106 and with database 110. When AR device 104 or AR device 106 scans one or more sections of a hard copy document and marks one or more sections of the document as confidential or as a gift, the content of the sections of the document that are marked are sent to server computer 108.

In some embodiments, server computer 108 can obfuscate the marked sections of the document, insert a marker into the obfuscate sections and make available electronic versions of the obfuscated documents to AR devices 104, 106. Server computer 108 can also send the documents to other computer devices that are part of a network (not shown) connected to server computer 108. Server computer 108 may also access database 110 for banking, financial or personal information regarding the user and to access certain documents that may be stored on database 110, such as a loan application or a mortgage. In some embodiments, AR devices 104, 106 can obfuscate the marked sections of the document, insert a marker into the obfuscate sections and send the document to server computer 108.

AR devices 104 and 106 also include optical character recognition (OCR) software for interpreting text on the documents to be scanned. The OCR software can also be used to detect markers in the scanned documents. For example, the OCR software can detect a special character, such as an asterisk in C*nfidential or detect a number such as 1 in G1ft and determine that C*nfidential and G1ft are markers in the scanned documents.

Figure 2:
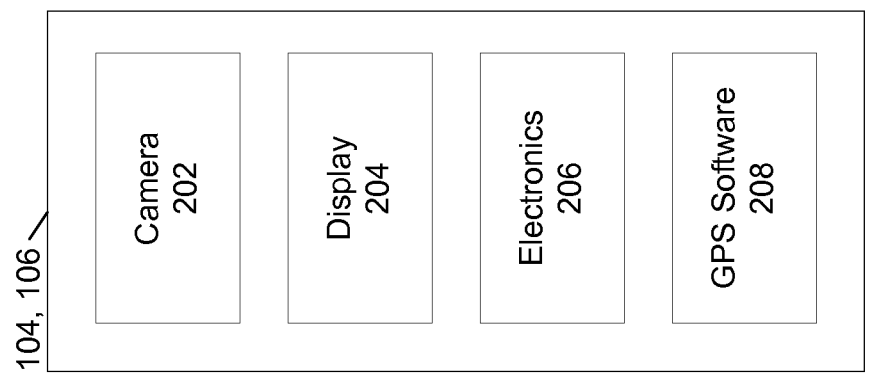
FIG. 2 shows example modules of the AR devices of FIG. 1.

FIG. 2 shows example modules 200 of AR devices 104 and 106. The example modules 200 include a camera 202, a display 204, electronics 206 and GPS software 208. The camera 202 is a camera that is built-in to AR devices 104 and 106. Display 204 is a display that is also built-in to AR devices 104 and 106. Electronics 206 includes an electronic computing device with wireless capability. The wireless capability can include Bluetooth, radio frequency identification (RFID), mobile telecommunications, Wi-Fi, or similar types of wireless capability. GPS software 208 is typically a software application that can be installed on the mobile electronic device. When AR device 104, 106 is an AR headset, camera 202, display, 204, electronics 206 and GPS software 208 are part of the AR headset.

FIGS. 3a and 3b show example sections of a scanned document. FIG. 3a shows a section of a scanned document 300 that includes obfuscated text. FIG. 3b shows the same section of the document with the text unobfuscated.

The section of the document shown in FIGS. 3a and 3b may be from a loan application, a mortgage application or similar type of financial document. Example information shown on this section of the document include a borrower's name, a social security number, a marital status, a date of birth (DOB), and address and a home telephone number. Referring to FIG. 3a, three items in this section, the social security number, the DOB and the address are considered to be confidential and are obfuscated on the document. In the document shown in FIG. 3a, the marker "C*nfidential" is used to identify obfuscated information for these items. The marker C*nfidential can also be used to obfuscate one or more items. For example, the actual social security number is replaced by the C*nfidential marker 304, the actual DOB is replaced by the C*nfidential marker 306 and the actual address is replaced by redacted text 308 that also includes a C*nfidential marker. In some embodiments, the redacted text 308 is used when an area to be obfuscated in a document is relatively larger than the length of the C*nfidential marker. The redacted text 308 covers up the area to be obfuscated.

Referring now to FIG. 3b, when the section of the document is viewed by an authorized user on an authorized AR device, the obfuscated text is removed and the actual content of the obfuscated items is shown. Thus, when viewed on the AR device, the actual social security number 123-45-6789 is displayed, the actual DOB 08-06-1974 is displayed and the actual address 20 Peony Lane, Home Town, USA is displayed. In an example embodiment, the actual social security number, DOB and address are projected as an overlay on the document when viewed with an AR device.

FIGS. 4a and 4b show an example section 400 from an example credit card statement. FIG. 4a shows the section with an obfuscated description and price. FIG. 4b shows the section with unobfuscated information.

For the section of the credit card statement shown in FIG. 4a, a gift is indicated as being purchased on Jun. 21, 2014. In alternative embodiments, the date of the purchase is obfuscated. Instead of a normal description for this purchase, the description 404 for the gift purchase is shown with an example marker G!ft. The marker includes a variation of the word Gift, with an exclamation point being substituted for the "i" in Gift. The price 406 for the gift purchase is obfuscated and is shown as xxxxx. In the embodiment shown, a total 408 for the purchases shown in the section of the credit card statement does not include the price of the gift purchase. The statement can also include an indicator (e.g. an asterisk) near the total 408 indicating that the total shown does not reflect the actual total. Alternatively, the total 408 can be obfuscated on the credit card statement. Therefore, someone viewing the credit card statement would not be able to determine a price of the gift by subtracting the prices of other purchases shown on the credit card statement from the total. The marker G!ft and the obfuscated price xxxxx shown in FIG. 4a are examples. Other markers and other ways of obscuring the price may be used.

Referring now to FIG. 4b, when the section of the credit card statement is viewed by an authorized user on an AR device, the actual content of the obfuscated items is shown. Thus, the actual description 412 is shown as QRS Jewelers, the actual price 414 is shown as $375.00 and the actual total price 416 is shown as $588.61.

FIGS. 5a and 5b show an example section 500 from a different credit card statement. The example section 500 includes a column for a transaction code. FIG. 5a shows the section with an obfuscated description and price. FIG. 5b shows the section with unobfuscated information.

For the section of the credit card statement shown in FIG. 5a, a gift is indicated as being purchased on Jun. 21, 2014. In alternative embodiments, the date of the purchase is obfuscated. A transaction code 504 for the gift includes a marker to indicate that the transaction is a gift purchase. In the example shown in FIG. 5a, the marker "Gift23456" includes the word "Gift" prepended to an actual transaction code "23456" for the purchase. In addition, instead of a specific description for the purchase, a generic description 506 of retail store is provided. The price of the purchase 508 is obfuscated and shown as xxxxx and the total price 510 of all transactions on the section of the statement does not include the price of the gift purchase. Alternatively, the total 510 can be obfuscated on the credit card statement. The marker "Gift23456" in the transaction code column is an example marker. Other ways to indicate a gift using a transaction code are possible.

Referring now to FIG. 5b, when the section of the credit card statement is viewed by an authorized user on an AR device, the actual content of the obfuscated items is shown. Thus, the actual transaction code 514 is shown as 23456, the actual description 516 is shown as QRS Jewelers, the actual price 518 is shown as $375.00 and the actual total price 520 is shown as $588.61.

Figure 6:
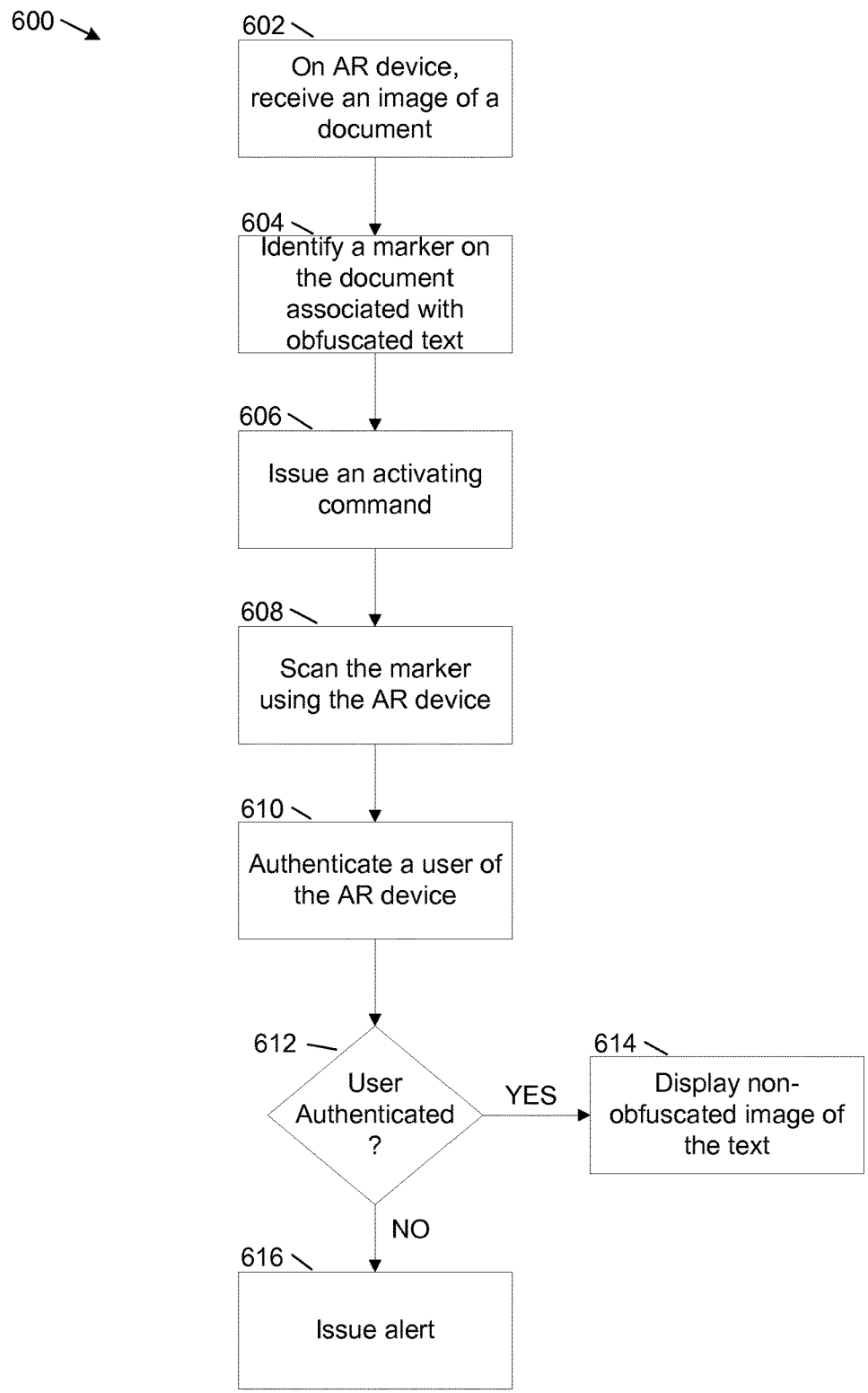
FIG. 6 shows a flowchart for an example method implemented on an AR device of FIG. 1 for obfuscating confidential data in a document.

FIG. 6 shows a flowchart of an example method 600 for using an AR device to view content obfuscated in a document. At operation 602, an image of a document is received at AR device 104. In some embodiments, the image is received at AR device 104 when the document is scanned by or viewed through the AR device 104. The document includes one or more areas of obfuscated text. In addition, the obfuscated text is associated with or includes a marker that can identify the text as being obfuscated. The document can be a financial document, such as a credit card statement, a debit card statement, a banking statement, a loan application, a mortgage, a brokerage statement, etc. The document can also be a business document that includes confidential information. Other similar type documents that include confidential or sensitive information are possible.

At operation 604, a marker on the document that is associated with obfuscated text is identified. The obfuscated text can comprise a redacted area of the document or an area of the document where the text has been overwritten with one or more characters so as to obfuscate the area of the document. The marker may be embedded in the obfuscated text or displayed near the obfuscated text. The marker is word or symbol that can be predetermined to be associated with the obfuscated text. The same word or symbol can be associated with every occurrence of obfuscated text or different words or symbols can be used. When the marker is predetermined, the marker can be used to identify the obfuscated text when AR device 104 scans the document.

At operation 606, an activating command is issued. The activating command can be a verbal command such as "open confidential view." The activating command can alternatively be generated automatically by the AR device upon identifying a marker or other indicium in the document. Other activating commands can be used.

At operation 608, the marker is scanned by AR device 104. When the marker is scanned by AR device 104, AR device 104 identifies the marker and correlates the marker with the identified obfuscated text.

At operation 610, the user of AR device 104 is authenticated. The user of AR device 104 can be authenticated by a biometric authentication method such as facial recognition, retinal recognition, voice recognition or finger print recognition.

At operation 612, a determination is made as to whether the user of AR device 104 is authenticated. At operation 612, when the user of AR device 104 is authenticated, at operation 614, non-obfuscated text is displayed on AR device 104. The non-obfuscated text is the non-obfuscated content of the obfuscated text associated with the marker. The non-obfuscated text can be displayed on AR device 104 as an overlay of the associated obfuscated text.

At operation 612, when a determination is made that the user of AR device 104 is not authorized to view the content of the obfuscated text, at operation 616 an alert is issued at AR device 104. The alert can be a visual alert such as a message displayed on AR device 104. An audible alert can also be started on AR device 104. An alert indicating that an unauthorized access attempt has occurred can also be provided to other parties. For example, depending on the type of document, an alert can be sent to both the sender and recipient of the document, as well as a predetermined third party, such as a manager or security official.

Figure 7:
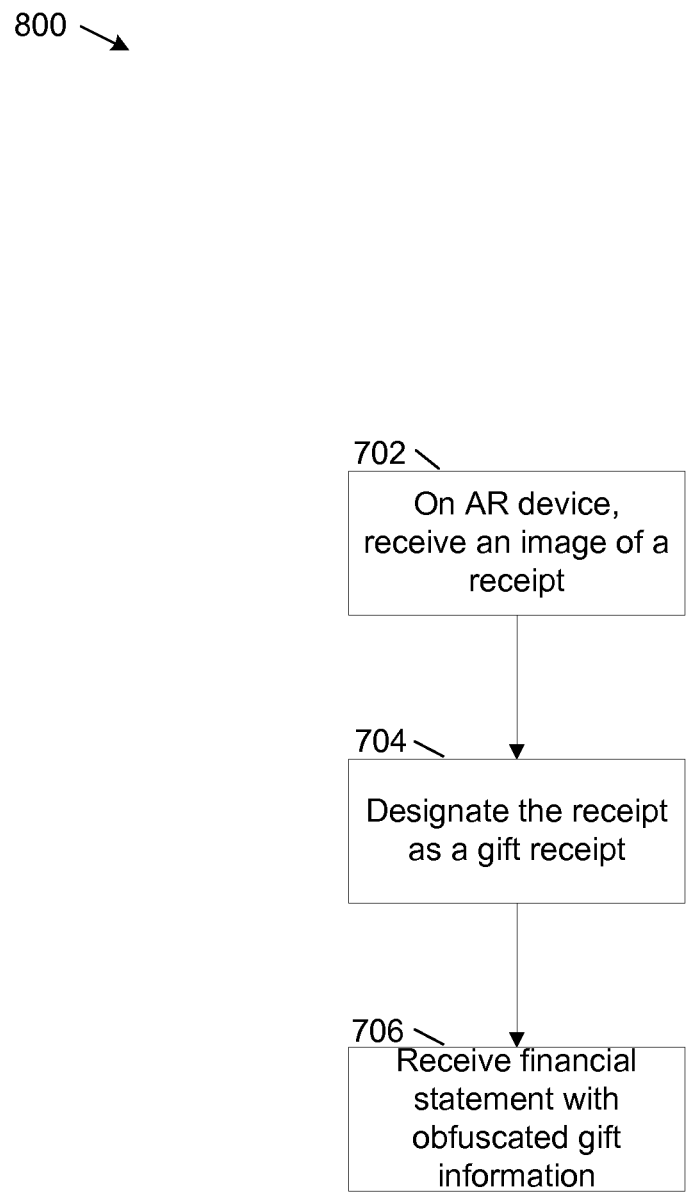
FIG. 7 shows a flowchart for an example method implemented on an AR device of FIG. 1 for viewing non-obfuscated confidential data in a document.

FIG. 7 shows a flowchart of an example method 700 for using an AR confidential view with a gift receipt. At operation 702 an image of a receipt is received at AR device 104. The image is received when a user of AR device 104 scans the receipt with AR device 104. The AR device may, for example, scan the merchant name and date on the receipt. The receipt can be a gift receipt for a gift that the user purchased for a family member. The user can scan the gift receipt in order to designate the gift receipt as confidential. The user may not want information regarding the gift purchase to appear on a financial statement that the family member may see. Alternatively, the user can access financial transactions via a financial institution website and designate certain transactions as confidential.

At operation 704, the user designates the receipt as a gift receipt. The user can designate the receipt as a gift receipt by issuing a verbal command such as "mark as gift." In the example above, when the AR device is used to scan the merchant name and date on the receipt, the scanned name and date can be correlated to a transaction on the financial account and marked as a gift transaction.

At operation 706, the user receives a financial statement that includes details of the gift purchase. Details regarding the gift purchase appear obfuscated on the financial statement. Per the example shown in FIGS. 4a and 5a, a description of the gift purchase is replaced by a generic term, as per FIG. 4a, or replace by a general description, as per FIG. 5a. In addition, the price of the purchase is obfuscated and a total price of transactions does not include the price of the gift.

Figure 8:
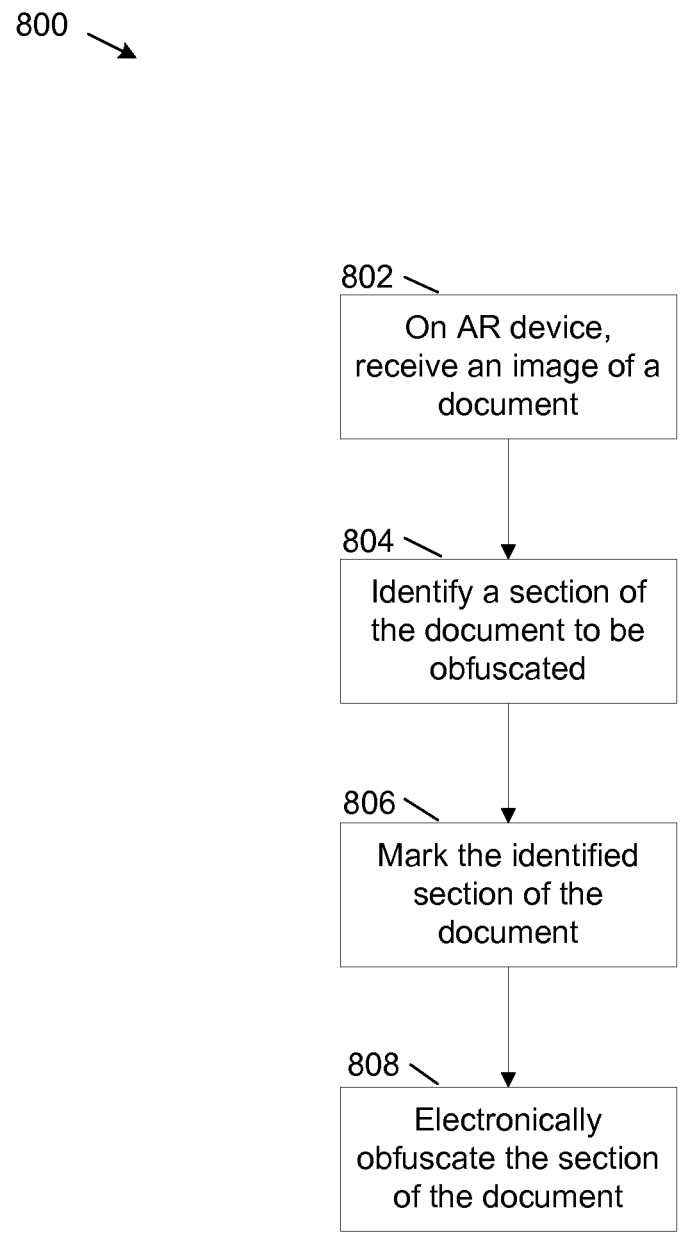
FIG. 8 shows a flowchart for an example method implemented on an AR device of FIG. 1 for using an AR confidential view in conjunction with a gift receipt.

FIG. 8 shows a flowchart of an example method 800 for electronically marking and obfuscating a portion of a document. At operation 802, an image of a document is received at an AR device. For the example method 800, the AR device is an AR headset device such as AR device 104. In other implementations, the AR device can also be a smartphone such as AR device 106. The image of the document is received at the AR device when the document is scanned by the AR device. The document can be, for example, a financial document such as a loan application, a business document such as marketing report, a sales receipt or any document that contains confidential or otherwise sensitive information. Depending on the type of document and the type or extent of the confidential or otherwise sensitive information, the entire document can be scanned or only one or more parts of the document is scanned.

At operation 804, a section of the document to be obfuscated is identified. The section can be a specific term in the document such as a social security number or the section can be a larger area of the document comprising one or more sentences. The section can also include tables and illustrations. The section can be identified by highlighting the section in the display area of the AR device. In some embodiments, each line of the document can be highlighted automatically when the line of the document appears in the display area of the AR device. The user of the AR device can move the AR device relative to the document, or issue a command, for example a verbal command, to scroll text up or down until the identified line is highlighted on the AR device. In some embodiments, a highlighting tool can be used to identify the section of the document. The highlighting tool can highlight the section of the document that is being viewed by the AR device and the highlighted section can be scanned in by the AR device.

At operation 806, the identified section is marked by the AR device. The identified section can be marked by associating a predetermined identifier with the identified section. In some embodiments, the predetermined identifier is a variation of a base word confidential such as "C*nfidential," whereby an asterisk is substituted for the "o" in confidential. However, other base words besides confidential can be used and other variations can be used, such as substituting different special characters in the base word, substituting more than one character, substituting in different locations, etc.

At operation 808, the identified section of the document is obfuscated. Obfuscating the identified section of the document comprises electronically obscuring the section of the document so that the content of the section cannot be understood. In some embodiments, the section can be obfuscated by redacting the section. In other embodiments, the section can be obfuscated by other means such as by overlaying different characters over the section so that the meaning of the section cannot be understood. In addition to obfuscating the section of the document, the marker or a variation of the marker can be inserted or overlaid onto the obfuscated section of the document. For example, the word C*nfidential can be overlaid on the identified section of the document to identify the obfuscated section of the document as being confidential.

In addition to obfuscating one or more sections of a document using an AR device, in some embodiments documents can be obfuscated in alternate ways. In some embodiments, word processing applications can use an obfuscation plug-in that can be designed for use with an AR device. When the obfuscation plug-in is installed, an obfuscation menu item or icon can be activated in the word processing application. When the user is editing a document using the word processing application, the user can highlight a word or section of the document and then select the obfuscation menu item or icon. The highlighted word or section can then appear obfuscated in the document. However, the non-obfuscated word or section is saved in the word processor so that when the obfuscated word or section is viewed by an AR device, the non-obfuscated word or section can be displayed on the display screen of the AR device.

In some embodiments, obfuscation in a document may occur automatically based on the sensitivity of information in the document. For example, the obfuscation plug-in for the word processing application may include a capability for enabling automatic obfuscation and may include a menu item or other means for enabling the user to enter words, phrases or types of information (such as social security numbers, credit scores, etc.) that are automatically obfuscated when the words, phrases or types of information appear in a document.

In some embodiments, the words, phrases and other types of information to be obfuscated can be entered into a digital dashboard associated with a server computer. When a document containing non-obfuscated text is received at the server computer, the server computer can automatically obfuscate any words, phrases and types of information in the document corresponding to the words, phrases and types of information entered into the digital dashboard.

In some embodiments, a purchase transaction can automatically be marked as a gift transaction at a point of sale device. For example the user can indicate to the sales person that the purchase is to be a gift or the sales person may ask the user if the purchase is to be a gift. When the purchase is designated as a gift, a gift indication can be automatically associated with the purchase. When the purchase is marked as a gift, the purchase transaction can automatically be obfuscated on a billing statement for the user. For example, selected details of the gift purchase transaction can include a gift marker (as described earlier herein) on the billing statement.

Figure 9:
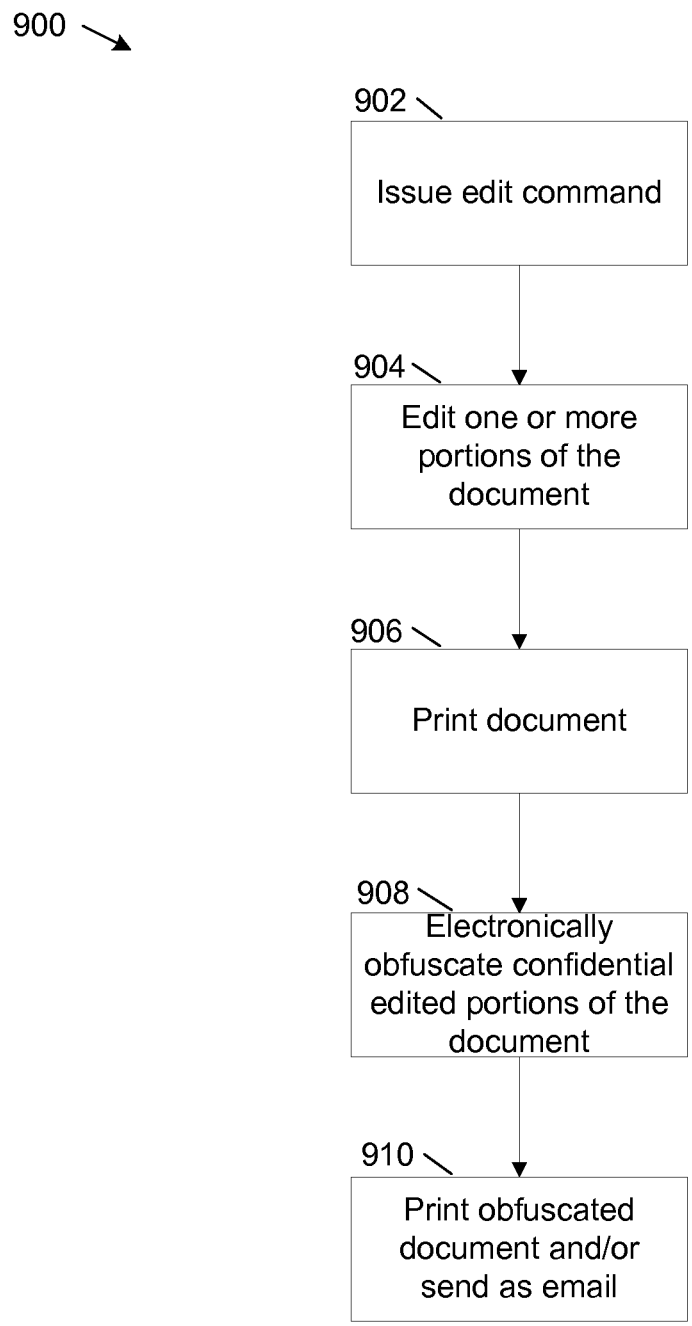
FIG. 9 shows a flowchart for an example method implemented on an AR device of FIG. 1 for editing a document in an AR confidential view.

FIG. 9 shows a flowchart for an example method 900 for editing a document in confidential view. In an example implementation, method 900 can be implemented after a non-obfuscated image of text in a document is displayed on AR device, for example after operation 614 of FIG. 6. For example, the non-obfuscated text may show an incorrect social security number and the user may wish to correct the social security number.

At operation 902, the user issues an edit command. For example, the user can say "edit" or a similar type verbal command. Issuing the edit command initiates an editing mode for the document at the AR device.

At operation 904, the user can edit the social security number and any other portion of the document. The user can edit the document in one or more ways. For example, the user can issue a verbal command such as "edit 123-45-6789 to 132-45-6789". In another example, the user can print out the document, cross out the incorrect correct social security number, write the correct social security on the document and scan the document with the AR device. Optical recognition software on the AR device can read in the correct social security number and electronically correct the social security number on the document. In a third example, when the AR device is a smartphone, the user can display the document on the smart phone and use the keyboard of the smartphone to edit the social security number. Other sections of the document can be edited in a similar manner. Other ways of editing the document in confidential view are possible.

At operation 906, the user can optionally print the corrected document. The user can also scan the corrected document into a database.

At operation 908, the confidential portions of the document are electronically obfuscated. For example, the confidential portions of the document can be obfuscated using a method similar to method 800 of FIG. 8.

At operation 910, the obfuscated document from operation 908 can be printed or scanned into the AR device and sent to other individuals in an email.

Figure 10:
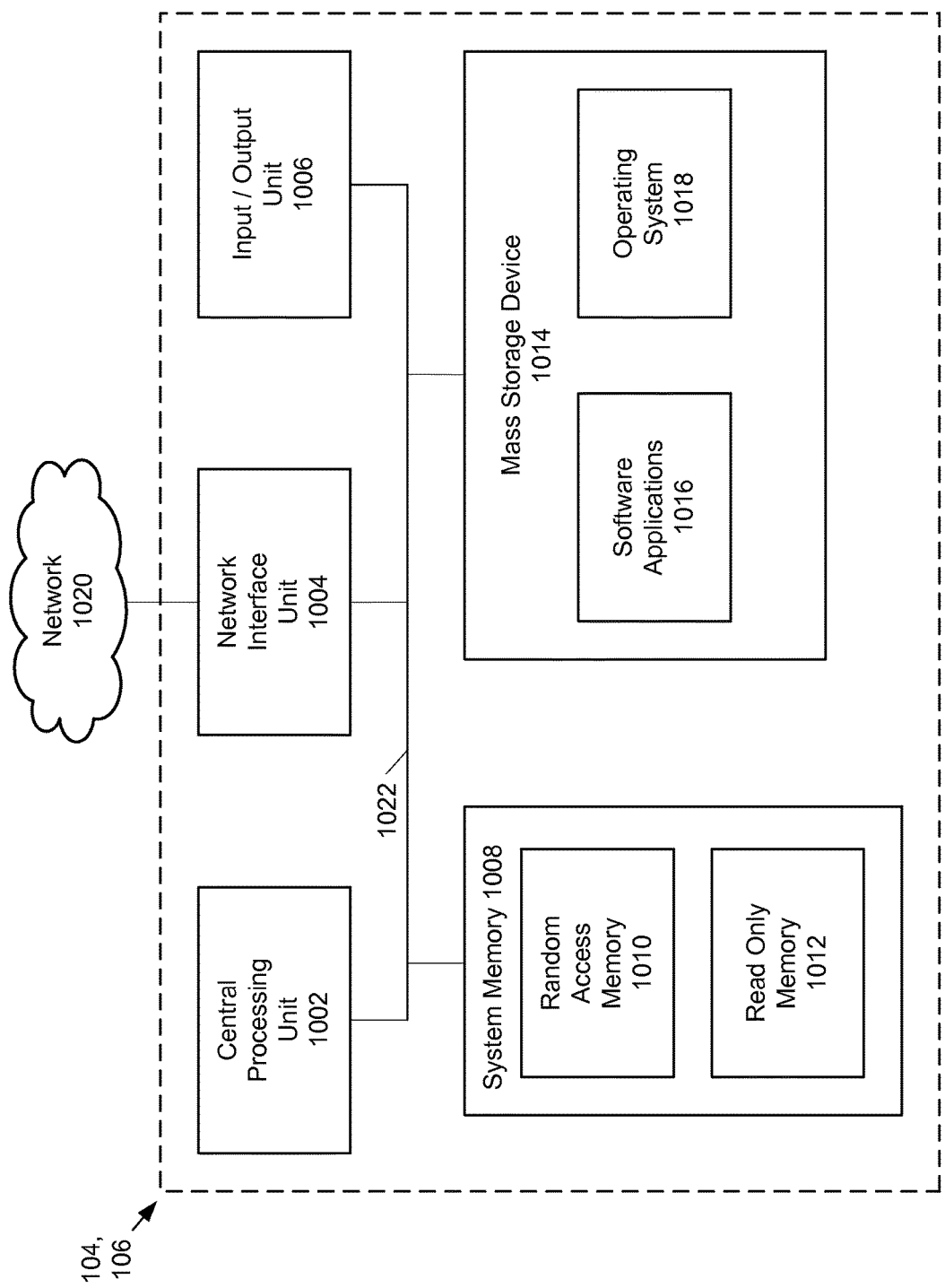
FIG. 10 shows example physical components of the AR device of FIG. 1.

As illustrated in the example of FIG. 10, AR device 104 includes at least one central processing unit ("CPU") 1002, a system memory 1008, and a system bus 1022 that couples the system memory 1008 to the CPU 1002. The system memory 1008 includes a random access memory ("RAM") 1010 and a read-only memory ("ROM") 1012. A basic input/output system that contains the basic routines that help to transfer information between elements within the AR device 104, such as during startup, is stored in the ROM 1012. The AR device 104 further includes a mass storage device 1014. The mass storage device 1014 is able to store software instructions and data. A central processing unit, system memory and mass storage device similar to that in FIG. 10 are also included in AR device 106.

The mass storage device 1014 is connected to the CPU 1002 through a mass storage controller (not shown) connected to the system bus 1022. The mass storage device 1014 and its associated computer-readable data storage media provide non-volatile, non-transitory storage for the AR device 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the AR device 104.

According to various embodiments of the invention, the AR device 104 may operate in a networked environment using logical connections to remote network devices through the network 1020, such as a wireless network, the Internet, or another type of network. The AR device 104 may connect to the network 1020 through a network interface unit 1004 connected to the system bus 1022. It should be appreciated that the network interface unit 1004 may also be utilized to connect to other types of networks and remote computing systems. The AR device 104 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the AR device 104 can store software instructions and data. The software instructions include an operating system 1018 suitable for controlling the operation of the AR device 104. The mass storage device 1014 and/or the RAM 1010 also store software instructions and software applications 1016, that when executed by the CPU 1002, cause the AR device 104 to provide the functionality of the AR device 104 discussed in this document. For example, the mass storage device 1014 and/or the RAM 1010 can store software instructions that, when executed by the CPU 1002, cause the AR device 104 to display received data on the display screen of the AR device 104.

The systems and methods can also include additional markers, referred to herein as permission level markers, which can indicate permissions associated with one or more sections of the document. Example permissions can include permission to view a section of a document, edit text in a section of the document, make stylistic changes in a section of document such as changing fonts or colors, print a section of the document and store data from a section of the document. Other examples of permissions are possible.

Each permission level marker can be associated with an authentication level for the user. Example authentication levels can include a minimum access level, an intermediate access level and a full access level. Referring now to FIGS. 11*a* and 11*b* in reference to example sections of a document 1100, in an example implementation the minimum access level can include permission to print and store first level non-obfuscated fields, such as address field 1106, but no other non-obfuscated fields; the intermediate access level can include permission to print and store second level non-obfuscated fields, such as date of birth field 1104 and to print and store all first level non-obfuscated fields, but no other non-obfuscated fields; and the full access level can include permission to print and store all non-obfuscated fields, including social security number field 1102.

More, fewer or different authentication levels are possible. In addition, the authentication levels can be used in different ways. For example, the example intermediate authentication level could include permissions to print all non-obfuscated fields but not store data from one or more non-obfuscated fields, whereas the full access field could permit printing and storing data from all non-obfuscated fields in the document.

The authentication levels associated with the permission level markers can be determined from a profile for the user. When the user logs in to a server computer, for example server computer 108, the server computer can authenticate the user and then assign the user an authentication level based on the user's profile. When the user logs in to the server computer to access the document, permission levels for sections of the documents can be assigned based on the authentication level for the user.

The permission level markers, as well as the other markers described earlier herein, can be control characters than can be embedded in the document and hidden from normal view. In an example implementation, a user with an authority to embed control characters in the documents can open the document. The user can highlight a section of the document for which the user wants to apply a permission level marker. For example, the user can highlight the section using a mouse. The user can then select a menu item corresponding to a permission level for the section of the document. The permission levels that are displayed are consistent with the authentication level for the user. For example, based upon the authentication level for the user, if the user is not authorized to print or save the highlighted section of the document, the user is not given permission level options for printing or saving.

When the section of the document is highlighted, the user can right click the mouse to bring up the menu of permissions. The menu can be in the form of a list box, a pull-down box or other similar graphical control element. The user can select and save a permission for the highlighted area of the document from the list box or other graphical control element. Other methods of associating a permission with a section of the document are possible.

In the example implementation, different ways can be used to identify areas of the document that are embedded with permission level markers. One example, as shown in FIG. 11*b*, uses shading to identify areas covered by permission level markers. In another example implementation color can be used. A legend can also appear on the document identifying what each shading or color mean. Other examples are possible.

The permission level markers can be viewed by the user when the user views non-obfuscated text. In an example implementation, the user can only view permission level markers that correspond to the authentication level for the user. One or more sections of the document can include a plurality of permission level markers. Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an augmented reality (AR) device, the method comprising:
   receiving an image of a document on the AR device, the image of the document including one or more areas of text;
   identifying a first permission level marker on the document, the first permission level marker identifying a first set of allowed permissions associated with a first area of the document, the first permission level marker comprising a variation in a word that identifies text in the first area;
   identifying a second permission level marker on the document, the second permission level marker identifying a second set of allowed permissions associated with a second area of the document, the second set of allowed permissions comprising the first set of allowed permissions and additional allowed permissions, the second set of allowed permissions including permission to make stylistic changes to text identified by the second permission level marker in the second area;
   scanning the first permission level marker and the second permission level marker using the AR device; and
   when the user of the AR device is authenticated,
      implementing stylistic changes to the text identified by the second permission level marker in the second area.

2. The method of claim 1, wherein the second set of allowed permissions include a permission to print the one or more sections of the document or permission to save data from the one or more sections of the document.

3. The method of claim 1, wherein each of the first permission level marker and the second permission level marker is associated with one of a plurality of authentication levels for the user of the AR device.

4. The method of claim 3, wherein the authentication levels include a first authentication level for minimum access, a second authentication level for intermediate access and a third authentication level for full access.

5. The method of claim 1, further comprising highlighting a section of the document and selecting a permission for the section of the document.

6. The method of claim 5, further comprising displaying a menu of permissions for the highlighted section of the document from which a user can select a permission for the highlighted section of the document.

7. The method of claim 6, wherein the menu of permissions includes permissions allowed based on an authentication level for the user.

8. The method of claim 6, further comprising coloring or shading the highlighted section of the document after the permission is selected, the coloring or shading corresponding to the selected permission.

9. The method of claim 6, wherein one or more sections of the document can include a plurality of permission level markers.

10. The method of claim 5, wherein when a permission is selected, the first permission level marker or the second permission level marker corresponding to the permission is embedded into the document.

11. An augmented reality (AR) electronic device comprising:
    a processor; and
    system memory, the system memory including instructions which, when executed by the processor, cause the AR device to:

receive an image of a document;
identify a first area of text on the document;
identify a first permission level marker on the document, the first permission level marker identifying a first set of allowed permissions associated with the first area of the document, the first permission level marker comprising at least one word having a special character embedded therein that identifies the text in the first area;
scan the first permission level marker;
identify a second permission level marker on the document, the second permission level marker identifying a second set of allowed permissions associated with a second area of the document, the second set of allowed permissions comprising the first set of allowed permissions and additional allowed permissions, the second set of allowed permissions including permission to change a font or color of text identified by the second permission level marker and to edit text identified by the second permission level marker in a section of the document corresponding to the second area; the second permission level marker being a control character embedded in the section of the document and viewable to the user;
authenticate a user of the AR device; and
when the user of the AR device is authenticated, permit an action corresponding to the one or more permissions for the section of the document, the action being one of changing the font or color of the text identified by the second permission level marker, in the section of the document.

* * * * *